United States Patent [19]
Erion

[11] 3,904,146
[45] Sept. 9, 1975

[54] ELECTROMAGNETICALLY CONTROLLED SEAT BELT RETRACTOR MECHANISM

[75] Inventor: Jeffrey A. Erion, Dearborn Heights, Mich.

[73] Assignee: Ford Motor Company, Dearborn, Mich.

[22] Filed: June 10, 1974

[21] Appl. No.: 478,023

[52] U.S. Cl. .................... 242/107.4; 200/61.45 M
[51] Int. Cl.² ..................................... B65H 75/48
[58] Field of Search ....... 242/107.4, 107 SB, 107 R; 280/150 SB; 200/61.45 M

[56] References Cited
UNITED STATES PATENTS

| | | | |
|---|---|---|---|
| 3,294,446 | 12/1966 | Fontaine | 280/150 SB |
| 3,603,525 | 9/1971 | Pringle et al. | 242/107.4 |
| 3,667,698 | 6/1972 | Fisher | 242/107.4 |

Primary Examiner—Leonard D. Christian
Attorney, Agent, or Firm—John J. Roethel; Keith L. Zerschling

[57] ABSTRACT

An electromagnetically controlled seat belt retractor mechanism including a spring-loaded reel to which a belt section is coupled for protraction against the resistance of the spring and retraction by action of the spring. A locking bar is engagable with the reel to lock the same against rotation in belt protraction direction. A cam means is journalled concentrically with the reel and is biased axially into frictional engagement with the latter for limited rotation therewith.

The cam means, after movement in belt protraction direction, is adapted to block movement of the locking bar into reel locking position until the cam means is restored to its initial position by rotation of the reel in retraction direction upon release of the protraction causing tension on the belt section. The improvement comprises an electromagnetic means energizable under selected conditions of vehicle operation to immobilize the cam means in locking bar blocking position to permit repeated protraction and retraction movements of the reel.

1 Claim, 2 Drawing Figures

ELECTROMAGNETICALLY CONTROLLED SEAT BELT RETRACTOR MECHANISM

BACKGROUND OF THE INVENTION

U.S. Pat. No. 3,412,952 issued Nov. 26, 1968 to G. Wohlert et al for a "Self-Retracting Webbing Roller for Safety Belts" and 3,667,698 issued June 6, 1972 to Robert C. Fisher for a "Locking Seat Belt Retractor" disclose what is known in the art as "one free pull retractor mechanism." That is, the seat occupant is permitted to pull the belt of the retractor reel in one uninterrupted motion. If the pulling force on the belt is released, whether or not the belt has been extended a sufficient distance to encompass the girth of the seat occupant, the reel reverses direction and the reel locking bar is permitted to drop into a reel locking position preventing further protraction of the belt. This has one obvious disadvantage. If the seat occupant did not protract the belt far enough to engage the buckle element to which the free end of the reel mounted belt is adapted to be latched, it is necessary to retract the reel mounted belt wholly into the retractor mechanism to reset the mechanism to permit another "free pull."

It is an object of the present invention to provide a retractor mechanism that is electromagnetically controlled to permit free wheeling protraction and retraction movements of the retractor reel until a predetermined vehicle operating mechanism is actuated, such as the shifting of the transmission shift lever out of park position to a position initiating movement of the vehicle.

SUMMARY OF THE INVENTION

The present invention relates to an electromagnetically controlled seat belt retractor mechanism including a spring-loaded reel to which a belt section is coupled for protraction against the resistance of the spring and retraction by action of the spring. A locking bar is engagable with the reel to lock the same against rotation in belt protraction direction. A cam means is journalled concentrically with the reel and is biased axially into frictional engagement with the latter for limited rotation therewith. The cam means after movement in belt protraction direction locks movement of the locking bar into reel locking position until the cam means is restored to its initial position by rotation of the reel in retraction direction upon release of the protraction causing tension on the belt section.

The improvement comprises electromagnetic means energizable under selected conditions of vehicle operation to immobilize the cam means in locking bar blocking position to permit repeated protraction and retraction movements of the reel.

DESCRIPTION OF THE DRAWING

Further features and advantages of the present invention will be made apparent as this description proceeds, reference being had to the accompanying drawing, wherein.

DETAILED DESCRIPTION OF THE INVENTION

Figure 1:
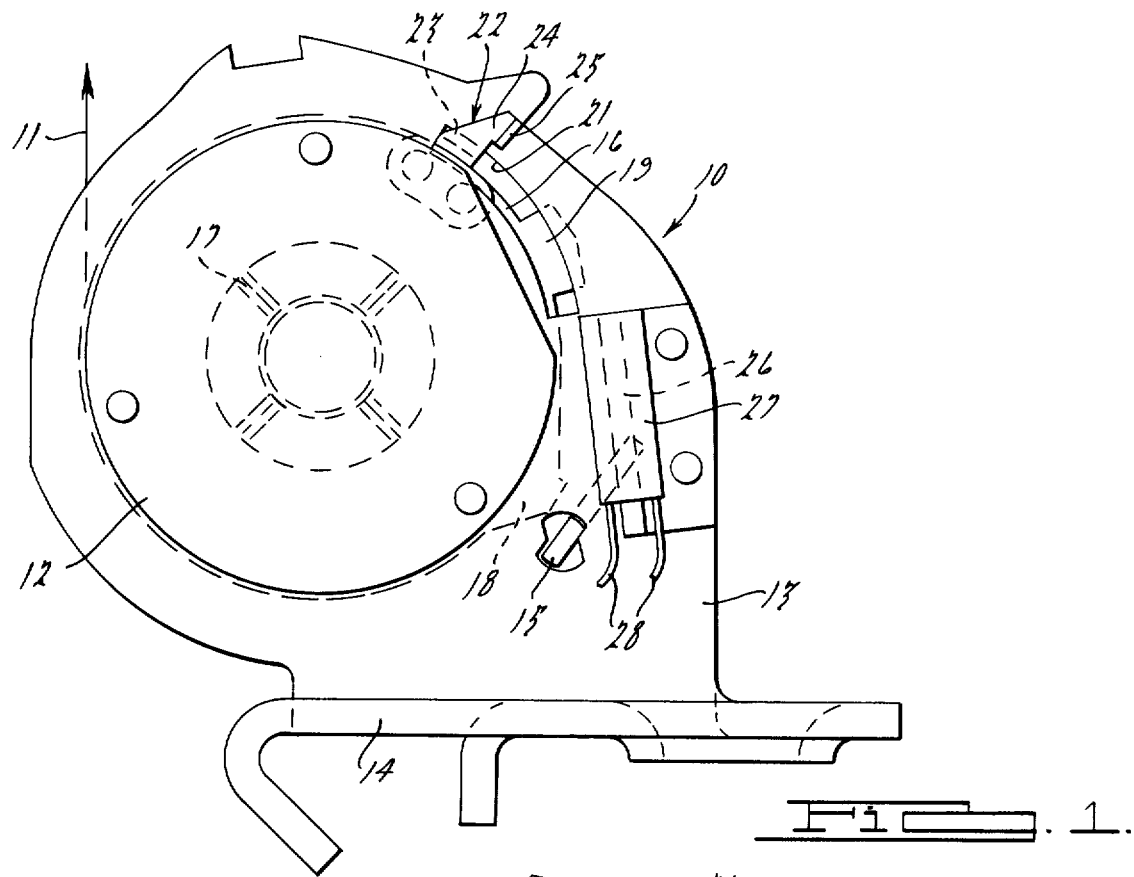
FIG. 1 is a side elevation of a seat belt retractor mechanism substantially similar to that disclosed in the aforementioned U.S. Pat. No. 3,667,698 with the electromagnetic control system embodying the present invention mounted thereon.

Referring now to the drawing, there is shown one end of a locking seat belt retractor 10 substantially of the type disclosed in the aforementioned U.S. Pat. No. 3,667,698. This type of retractor includes a spring-loaded reel (not visible) to which a belt section is coupled for protraction by pulling the belt in the direction of the arrow 11 off the reel against the resistance of the retractor rewind spring (not shown). The rewind spring is contained within the housing 12 mounted on the exterior surface of the side wall 13 of the retractor frame 14.

A spring-loaded locking bar 15 is provided for locking the belt section against protraction at any desired degree of extension, the locking bar upon limited retraction of the belt section being engagable with the reel to lock the latter against further unwinding rotation. A cam means in the form of an annular cam plate or disk 16 is journalled concentrically with the reel for limited rotation with the latter. The cam plate is biased axially by a spring washer 17 into frictional engagement with the reel. The spring washer 17 is interposed between the side wall 13 of the retractor frame 14 and the reel end in proximity to the wall.

The cam means after rotation in belt protraction direction of rotation of the reel blocks movement of the locking bar into reel locking position until the cam means is restored to its initial position. This occurs upon rotation of the reel in retraction direction upon release of the pulling force or protraction causing tension on the belt section.

The cam plate or disk 16 has two cam lobes 18 and 19. The cam lobe 18 is positioned to lie in the path of locking bar 15 when the cam plate or disk 16 is in the FIG. 1 position as occurs during retraction or fully retracted condition of the belt reel. The lobe 19 is positioned to lie in the path of the locking bar 15 upon the cam plate or disk 16 being rotated in a clockwise direction from its FIG. 1 to its FIG. 2 position upon protraction rotation of the reel.

Movement of the cam plate or disk 16 is limited to the length of the arcuate slot 21 in the retractor frame side wall 13. Rivoted to the perimeter of the cam plate 16 is a contact bar 22 having an arm section 23 projecting through the slot 21 and terminating in a right angle section 24 having an anvil portion 25 at its extremity. The contact bar 22 is adapted to have its anvil portion engage the core 26 of a solenoid 27 fastened to the exterior surface of the side wall 13. The solenoid 27 is coupled to a source of current through leads 28.

With solenoid 27 de-energized, the retractor mechanism functions as a typical "one free pull" mechanism. That is, a protraction force exerted on the seat belt section in the direction of the arrow 11 in FIG. 1 causes the retractor reel to rotate in a clockwise direction. The cam plate or disk 16 is frictionally dragged in a clockwise direction moving its lobe 18 out of the path of the pivoting locking bar 15. The locking bar 15 is held away from the belt reel, however, by a finger riding on the retracted belt section surface as disclosed by U.S. Pat. No. 3,412,952 or by an auxiliary cam as disclosed by U.S. Pat. No. 3,667,698 and, as the belt unreels, by the lobe 19 on the cam plate or disc 16, see FIG. 2.

As soon as the pulling force on the belt section is released, and it may be a very slight release, the reel under the influence of the retractor rewind spring reverses direction of rotation and drags the cam plate or disk 16 back to its FIG. 1 position. During the time interval in which the reverse movement is occurring, the locking bar 15 flips in a counterclockwise direction into engagement with the reel, thus preventing any attempt to further rotate the reel in a clockwise or belt section protraction direction.

This has the obvious disadvantage that if the belt section has not been extended sufficiently around the seat occupant to reach the buckle element on the fixed length section of the belt system, it is impossible to further extend the reeled belt section until the extended portion is first completely retracted to reset the mechanism for another protraction effort.

Figure 2:
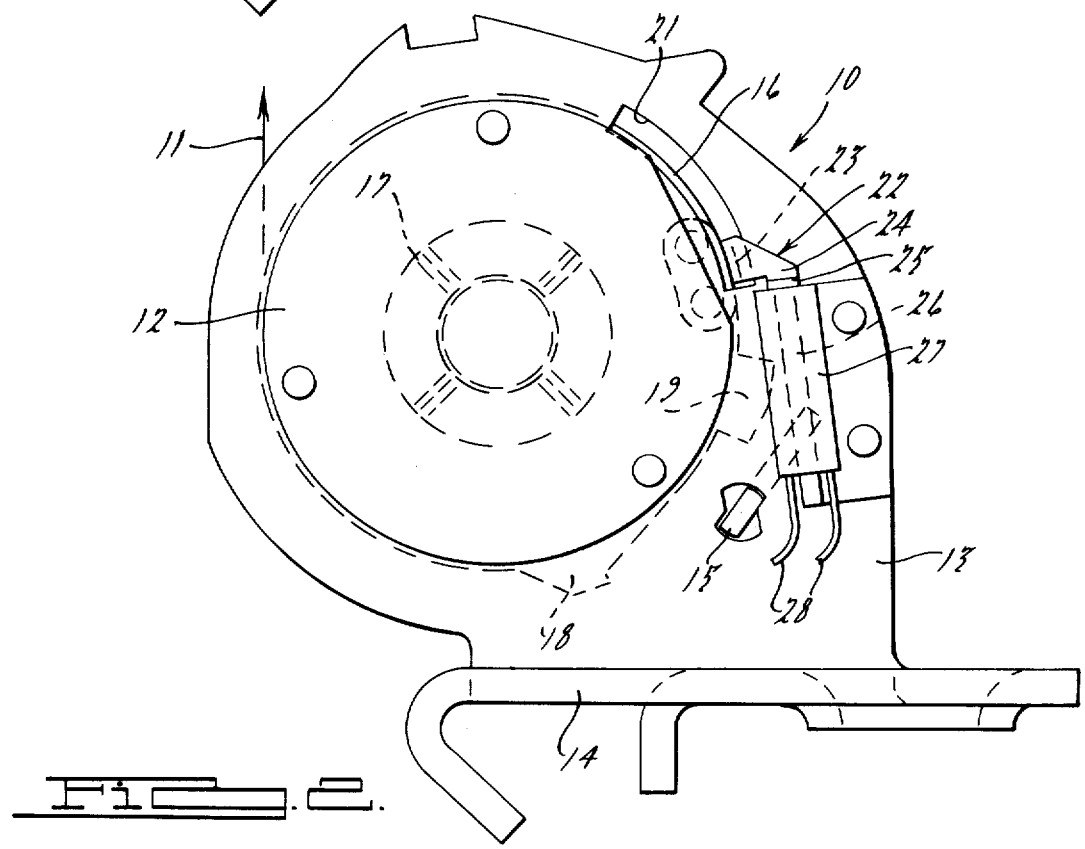
FIG. 2 is a view in part similar to FIG. 1 illustrating the electromagnetic control elements in a second operative position.

It is the function of the solenoid to hold the cam plate or disk in the FIG. 2 position during the time required to fit the belt about the seat occupant. When the anvil 25 is magnetically held against the core 26 of the solenoid, the retractor reel becomes free-wheeling or freely rotatable in either direction. After the belt has been properly buckled, the locking bar is permitted to function as a reel locking device. This requires that the solenoid be de-energized at the proper time after having been energized to cause it to hold the locking bar and thereby the cam plate or cam disk in its FIG. 2 position.

An electrical circuit for properly energizing and de-energizing the solenoid is described in U.S. patent application Ser. No. 478,024 entitled "Circuit for Controlling a Seatbelt Retractor" filed June 10, 1974 in the name of Kenneth G. Slotkowski and assigned to the assignee of the present invention.

The control circuit disclosed in this patent application prevents the locking of the seat belt retractor if the vehicle is in a predetermined condition, such as its transmission lever being in a neutral or park position and if the vehicle seating position for which the seat belt is provided is occupied. Under such conditions, a switch responsive to the transmission shift lever is in a closed condition and a seat sensor switch is also closed. The solenoid is in a closed circuit with these two switches and thereby becomes energized. Upon protraction of the seat belt, the contact bar 22 is swung by cam plate or disk 16 into contact with the solenoid core 26. The cam plate or disk 16 is held in the FIG. 2 position in which its lobe 19 locks movement of the locking bar into reel blocking position. Accordingly, the reel is free to move in either direction of rotation. The belt section may be protracted or retracted as many times as desired until a comfortable fit is found around the seat occupant.

Once the belt is buckled and as soon as the transmission shift lever is moved out of the park or neutral position, the switch associated with the transmission lever is opened and the solenoid 27 is then de-energized permitting the cam plate or disk 16 to be retracted from its FIG. 2 to its FIG. 1 position. This renders the locking bar 15 operable to lock the retractor reel against movement in belt protraction direction in the same manner as explained with reference to a de-energized solenoid.

To a further extent necessary for an understanding of the present invention, the disclosure of the Slotkowski patent application is incorporated herein by reference.

It is to be understood that this invention is not limited to the exact construction illustrated and described above, but that various changes and modifications may be made without departing from the spirit and scope of the invention as defined by the following claims:

I claim.

1. An electromagentically controlled seat belt retractor mechanism having a frame journalling a spring-loaded reel to which a seat belt is coupled for protraction and retraction, the reel having fixed thereto at least one toothed ratchet wheel, a pivotally mounted locking bar biased for movement into engagement with the ratchet wheel to lock the wheel against rotation in protraction direction, a cam disk biased axially of the reel into frictional engagement with the side face of the ratchet wheel, the cam disk being rotatable by the ratchet wheel to a position in which a blocking portion thereon lies in the path of the locking bar to block the latter against movement into ratchet wheel locking engagement whereby the reel remains freely movable in either protracting or retracting directions, wherein the improvement comprises:

a solenoid mounted on the retractor mechanism frame externally of one side of the latter and a contact member mounted on the cam disk, the contact member having a part thereof projecting outwardly through a slot in the one side wall in position to engage the solenoid when the cam disk blocking portion is in locking bar movement blocking position, the contact member when in solenoid engaging position being magnetically locked to the solenoid upon the latter being energized, thereby immobilizing the cam disk in locking bar blocking position and maintaining the free movement condition of the reel, and a source of current for energizing the solenoid.

* * * * *